(12) United States Patent
Lee et al.

(10) Patent No.: US 10,088,614 B2
(45) Date of Patent: Oct. 2, 2018

(54) GUEST-HOST TYPE LIQUID CRYSTAL COMPOSITION

(71) Applicant: LG CHEM, LTD., Seoul (KR)

(72) Inventors: Ji Youn Lee, Daejeon (KR); Sin Young Kim, Daejeon (KR); Moon Soo Park, Daejeon (KR); Dae Hee Lee, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 15/504,972

(22) PCT Filed: Jul. 4, 2016

(86) PCT No.: PCT/KR2016/007194
§ 371 (c)(1),
(2) Date: Feb. 17, 2017

(87) PCT Pub. No.: WO2017/003268
PCT Pub. Date: Jan. 5, 2017

(65) Prior Publication Data
US 2017/0293058 A1  Oct. 12, 2017

(30) Foreign Application Priority Data

Jul. 2, 2015 (KR) .................. 10-2015-0094600
Jul. 4, 2016 (KR) .................. 10-2016-0084188

(51) Int. Cl.
| | | |
|---|---|---|
| *G02F 1/1333* | (2006.01) | |
| *G02B 5/30* | (2006.01) | |
| *C09K 19/02* | (2006.01) | |
| *C09K 19/60* | (2006.01) | |
| *G02F 1/133* | (2006.01) | |

(52) U.S. Cl.
CPC ............ *G02B 5/3016* (2013.01); *C09K 19/02* (2013.01); *C09K 19/60* (2013.01); *G02B 5/3041* (2013.01); *G02F 1/133* (2013.01)

(58) Field of Classification Search
CPC ....... C09K 19/02; C09K 19/60; G02F 1/1333; G02F 1/133; G02B 5/3016; G02B 5/3041
USPC ...................................... 252/299.01; 428/1.1
See application file for complete search history.

(56) References Cited

U.S. PATENT DOCUMENTS

| | | | |
|---|---|---|---|
| 5,773,178 A | 6/1998 | Shiota et al. | |
| 7,998,543 B2 * | 8/2011 | Seki ............... | C07D 305/06 252/299.61 |
| 9,182,624 B2 * | 11/2015 | Min ................ | G02F 1/1334 |
| 9,588,369 B2 * | 3/2017 | Min ................ | G02F 1/1334 |

FOREIGN PATENT DOCUMENTS

| | | |
|---|---|---|
| JP | 07-005437 A | 1/1995 |
| JP | 2008-233757 A | 10/2008 |
| JP | 2010152351 | 7/2010 |
| JP | 2013235216 A | 11/2013 |
| KR | 1020080097232 A | 11/2008 |
| KR | 1020100024784 A | 3/2010 |
| KR | 1020150039122 A | 4/2015 |

* cited by examiner

*Primary Examiner* — Geraldina Visconti
(74) *Attorney, Agent, or Firm* — Dentons US LLP

(57) ABSTRACT

The present application relates to a liquid crystal composition, a polarizing element and a use of the polarizing element. Since the polarizing element may be prepared by a simple coating process, the guest host type liquid crystal composition of the present application allows not only for reducing the manufacturing cost and lightweight thinning of the polarizing element, but also for manufacturing the polarizing element showing an excellent heat resistant stability without changes of absorption spectrum to transmission spectrum even in a severe condition such as high temperature environment. Such a polarizing element can be applied to various display devices such as liquid crystal display devices, EL display devices, field emission display devices, display devices using electronic papers, projection display devices or piezoelectric ceramic display devices.

13 Claims, 2 Drawing Sheets

[Figure 1]
[Figure 2]
[Figure 3]
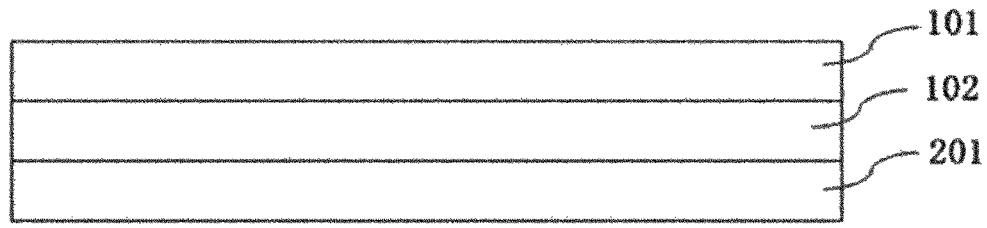

[Figure 4]
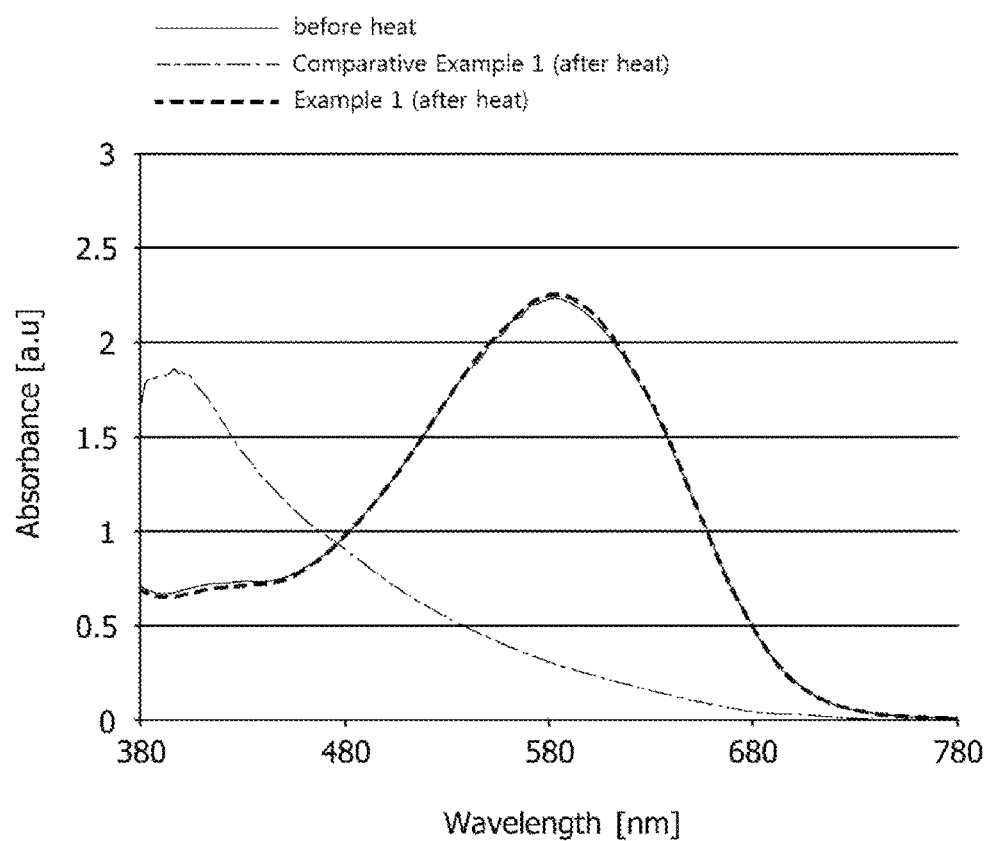

GUEST-HOST TYPE LIQUID CRYSTAL COMPOSITION

CROSS-REFERENCE OF RELATED APPLICATIONS

This application is a National Stage Application of International Application No. PCT/KR2016/007194, filed Jul. 4, 2016, and claims the benefit of Korean Patent Application No. 10-2016-0084188, filed Jul. 4, 2016, and Korean Patent Application No. 10-2015-0094600, filed Jul. 2, 2015, the contents of which are incorporated herein by reference in their entirety for all purposes as if fully set forth below.

TECHNICAL FIELD

The present application relates to a guest host type liquid crystal composition, a polarizing element and a use of the polarizing element.

BACKGROUND ART

The polarizing element utilized in display devices is formed of a composite film structure of for example an iodine-dyed polyvinyl alcohol (PVA) film and a protective film for protecting this film, for example, a triacetyl cellulose (TAC) film.

Recently, development of a new concept thin-film polymeric polarizing film being formed by a simple coating process has been sought as an alternative to the film type multi-layer element through the iodine dyeing. The process technology of thin-film formation of the polarizing film through such a structure simplification and low-cost manufacturing is a key technology for LCD cost saving and flexible display embodiment, where the technology for preparing the polarizing element by coating a dye layer comprising a dichroic dye and a polymeric liquid crystal compound as in Patent Document 1 (JP Unexamined Patent Publication No. 2010-152351) has been known.

However, to use the polarizing element in the display devices, physical properties are required, which can maintain the absorption spectrum even under severe conditions such as high temperature conditions, but since the coating type polarizing element with the dichroic dye has the lowered heat-resistant stability, there is a problem that the dye molecules are degraded in high temperature conditions to change the absorption spectrum, whereby there is a limit in using it for the display device. Therefore, recently, it is a trend in the display device field to increase studies for developing the coating type polarizing element that can ensure the heat-resistant stability.

DISCLOSURE

Technical Problem

The present application provides a guest host type liquid crystal composition, a polarizing element and a use of the polarizing element.

Technical Solution

The present application relates to a guest host type liquid crystal composition. An exemplary guest host type liquid crystal composition may comprise a polymerizable liquid crystal compound without any acryloyl polymerizable group and a dichroic dye. In the present application the guest host type liquid crystal composition can mean, for example, a liquid crystal composition having a property being capable of forming a polarizing element that represents an anisotropic light absorption effect. For example, as the dichroic dye is arranged together depending on the arrangement of the polymerizable liquid crystal compound to absorb light parallel to the alignment direction of the dye and to transmit light perpendicular to the direction, as described later, the guest host type liquid crystal composition can form the polarizing element showing the anisotropic light absorption effect.

The liquid crystal composition of the present application may exhibit excellent heat resistance even after being polymerized into the liquid crystal layer. For example, the liquid crystal composition can satisfy Equation 1 below.

$$-20 \leq 100 \times (H-W)/W \leq 20 \qquad \text{[Equation 1]}$$

In Equation 1, W may refer to the maximum absorption wavelength of the dye immediately after the polymerizable liquid crystal compound is polymerized, and H may refer to the maximum absorption wavelength of the dye after maintaining the liquid crystal composition having the liquid crystal compound polymerized at 100° C. for 100 hours. That is, the liquid crystal composition may have the absolute value of the maximum absorption wavelength change rate of the dye in a high temperature condition of 20 or less, as calculated by the above Equation 1.

The maximum absorption wavelength change rate of the dye as calculated by Equation 1 may be, more specifically, within the range of $\pm 17.5$, within the range of $\pm 15$, within the range of $\pm 12.5$ or within the range of $\pm 10$. The change rate of the maximum absorption wavelength of the dye may be calculated by measuring the absorption spectrum of the dye layer described in Examples to be described later. As such a maximum absorption wavelength change rate of the dye has the lower value, the heat-resistant stability of the polarizing element prepared from the liquid crystal composition is ensured, the lower limit of which is not particularly limited.

In this specification, the "polymerizable liquid crystal compound" can mean a compound comprising a site being capable of exhibiting liquid crystallinity, for example, a mesogenic skeleton and at least one polymerizable functional group. The liquid crystal composition of the present application may comprise a polymerizable liquid crystal compound which includes no acryloyl polymerizable functional group as a polymerizable functional group, as described above. In the present application the acryloyl polymerizable functional group may have, for example, a meaning including an acryloyl group or a methacryloyl group in a sense representing, for example, polymerizable functional groups by radical reactions.

The liquid crystal composition of the present application may comprise as a main component a polymerizable liquid crystal compound that includes no acryloyl polymerizable functional group. As used herein, the term "main component" can mean that about 70% by weight or more, about 75% by weight, about 80% by weight or more, about 85% by weight or more, about 90% by weight or more or about 95% by weight or more is included in the composition.

As the polymerizable liquid crystal compound that includes no acryloyl polymerizable functional group, for example, a cationic polymerizable liquid crystal compound can be used. In this application the cationic polymerizable liquid crystal compound can mean, for example, a liquid crystal compound having at least one or more polymerizable functional groups by cationic polymerization reaction. Such a cationic polymerizable functional group may include, for example, an epoxy group. The cationic polymerizable liquid crystal compound may be, for example, a mono-functional polymerizable liquid crystal compound comprising one of the epoxy groups or a multi-functional polymerizable liquid crystal compound comprising two or more, for example, 2 to 10, 2 to 8, 2 to 6, 2 to 5, 2 to 4, 2 to 3 or 2, of the epoxy group.

As the polymerizable liquid crystal compound, for example, a compound represented by Formula 1 below can be used.

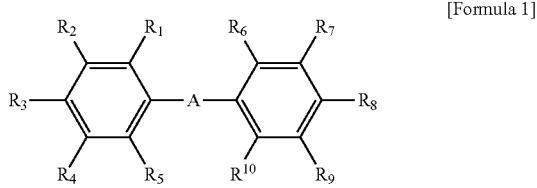

[Formula 1]

In Formula 1 above, A is a single bond, —COO— or —OCO—, $R_1$ to $R_{10}$ are each independently hydrogen, halogen, an alkyl group, an alkoxy group, an alkoxycarbonyl group, a nitro group, an epoxy group, a cyano group, —OQP or a substituent of Formula 2 below, provided that at least one of $R_1$ to $R_{10}$ is an epoxy group, a cyano group, —O-Q-P or a substituent of Formula 2 below, or two adjacent substituents of $R_1$ to $R_5$ or two adjacent substituents of $R_6$ to $R_{10}$ are linked from each other to form a benzene substituted with —O-Q-P, Q is an alkylene group or an alkylidene group, and P is an epoxy group:

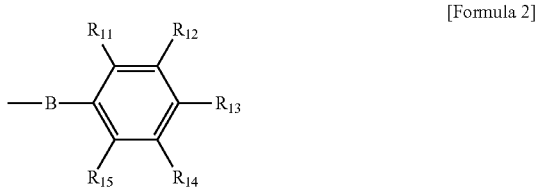

[Formula 2]

In Formula 2 above, B is a single bond, —COO— or —OCO—, $R_{11}$ to $R_{15}$ are each independently hydrogen, halogen, an alkyl group, an alkoxy group, an alkoxycarbonyl group, a nitro group, an epoxy group, a cyano group or —O-Q-P, provided that at least one of $R_{11}$ to $R_{15}$ is an epoxy group, a cyano group, or —O-Q-P, or two adjacent substituents of $R_{11}$ to $R_{15}$ are linked from each other to form a benzene substituted with —O-Q-P, Q is an alkylene group or an alkylidene group, and P is an epoxy group.

In Formulas 1 and 2 above, to form a benzene substituted with —O-Q-P by linking two adjacent substituents from each other can mean to form a naphthalene skeleton generally substituted with —O-Q-P by linking two adjacent substituents from each other.

In Formula 2 above, "—" in the left side of B can mean that B is connected directly to the benzene of Formula 1.

In Formulas 1 and 2 above, the term "single bond" means the case that no atom is present in the portion represented by A or B. For example, if A in Formula 1 is a single bond, benzenes in both sides of A may be directly connected to form a biphenyl structure.

In Formulas 1 and 2 above, as halogen, chlorine, bromine or iodine and the like can be illustrated.

The term "alkyl group" herein can mean a linear or branched alkyl group of 1 to 20 carbon atoms, 1 to 16 carbon atoms, 1 to 12 carbon atoms, 1 to 8 carbon atoms or 1 to 4 carbon atoms or a cycloalkyl group of 3 to 20 carbon atoms, 3 to 1t6 carbon atoms or 4 to 12 carbon atoms, unless otherwise specified. The alkyl group may be optionally substituted with one or more substituents.

The term "alkoxy group" herein can mean an alkoxy group of 1 to 20 carbon atoms, 1 to 16 carbon atoms, 1 to 12 carbon atoms, 1 to 8 carbon atoms or 1 to 4 carbon atoms, unless otherwise specified. The alkoxy group may be straight, branched or cyclic. In addition, the alkoxy group may be optionally substituted with one or more substituents.

In addition, the term "alkylene group or alkylidene group" herein can mean an alkylene group or an alkylidene group of 1 to 12 carbon atoms, 1 to 8 carbon atoms or 1 to 4 carbon atoms, unless otherwise specified. The alkylene group or alkylidene group may be straight, branched or cyclic. Furthermore, the alkylene group or alkylidene group may be substituted optionally with one or more substituents.

In addition, the alkenyl group herein can mean an alkenyl group of 2 to 20 carbon atoms, 2 to 16 carbon atoms, 2 to 12 carbon atoms, 2 to 8 carbon atoms or 2 to 4 carbon atoms, unless otherwise specified. The alkenyl group may be straight, branched or cyclic. Furthermore, the alkenyl groups may be optionally substituted with one or more substituents.

In this specification, as the substituent that can be substituted for a particular functional group, an alkyl group, an alkoxy group, an alkenyl group, an oxo group, an oxetanyl group, a thiol group, an epoxy group or a cyano group may be illustrated, and preferably, it may be substituted with an epoxy group.

The liquid crystal composition may also include a dichroic dye, as described above. In the present application, a dye can mean, for example, a material which can intensively absorb and/or modify light within at least some or all of the entire range in a visible region, for example, in a wavelength range of 400 nm to 700 nm, and the dichroic dye can mean a material which can anisotropically absorb light within at least some or all of the entire range.

As the dichroic dye, for example, those known to be capable of forming the so-called guest host type liquid crystal element, for example, the publicly known dyes known to have properties that can be oriented according to the orientation of the polymerizable liquid crystal compound may be selected and used. As such a dichroic dye, dyes having a maximum absorbance, for example, within a visible region, for example, 400 nm to 700 nm may be also used. Such a dye may include, for example, one or more dyes from a cyan dye, an anthraquinone dye, an acridine dye, a cyanine dye and a naphthalene dye, without being limited thereto.

As the dichroic dye, dyes having a dichroic ratio, that is absorption of the polarized light parallel in the major axis direction of the anisotropic dye divided by absorption of the polarized light parallel in the direction perpendicular to the major axis direction, of 5 or more, 6 or more, 7 or more, 8 or more, 9 or more or 10 or more can be used. The dye can satisfy the dichroic ratio at at least some wavelengths or any one wavelength within a wavelength range of a visible region, for example within a wavelength range of about 380 nm to 700 nm or about 400 nm to 700 nm. The upper limit of the dichroic ratio may be, for example, of the order of 20 or less, 18 or less, 16 or less or 14 or less.

The content of the dichroic dye in the liquid crystal composition may be suitably selected within a range that does not impair the desired physical properties. For example, the dichroic dye may be contained in a ratio within a range of 0.1 parts by weight to 20 parts by weight relative to 100 parts by weight of the polymerizable liquid crystal compound to 100 parts by weight compared to 20 parts by weight. More specifically, the dichroic dye may be included in a range of 0.1 parts by weight or more, 1 part by weight or more, 2 parts by weight or more, 3 parts by weight or more, 4 parts by weight or more, 5 parts by weight or more, 6 parts by weight or more, 7 parts by weight or more, 8 parts by weight or more, 9 parts by weight or more, or 10 parts by weight or more, relative to 100 parts by weight of the polymerizable compound, and may be included in a range of 20 parts by weight or less, 19 parts by weight or less, 18 parts by weight or less, 17 parts by weight or less, 16 parts by weight or less, 15 parts by weight or less, 14 parts by weight or less, 13 parts by weight or less, 12 parts by weight or less or 11 parts by weight or less, relative to 100 parts by weight of the polymerizable compound.

When a cationic polymerizable liquid crystal compound is included as the polymerizable liquid crystal compound, the liquid crystal composition may further comprise a cationic initiator. As such a cationic initiator, ionized cationic initiators of onium salt or organometallic salt series or non-ionized cationic initiators of organosilane or latent sulfonic acid series or other non-ionized compounds may be used. As the initiator of onium salt series, diaryliodonium salts, triarylsulfonium salts, or aryldiazonium salts and the like maybe illustrated, and as the initiator of organometallic salt series, iron arenes and the like may be illustrated, and as the initiator of organosilane series, o-nitrobenzyl triaryl silyl ethers, triaryl silyl peroxides or acyl silanes and the like may be illustrated, and as the initiator of latent sulfonic acid series, α-sulfonyloxy ketones or a-hydroxymethylbenzoin sulfonates may be illustrated, but are not limited thereto. In addition, as the cationic initiator a mixture of an initiator of iodine series and a photosensitizer can also be used. As such a photosensitizer anthracene compounds, pyrene compounds, carbonyl compounds, organosulfur compounds, persulfides, redox compounds, azo and diazo compounds, halogen compounds or photoreducible pigments and the like may be illustrated.

The content of the cationic initiator can be appropriately adjusted according to the desired polymerization degree, and for example, included in a ratio within a range of 0.1 parts by weight to 20 parts by weight relative to 100 parts by weight of the cationic polymerizable liquid crystal compound. More specifically, the cationic initiator may be included in a range of 0.1 parts by weight or more, 1 part by weight or more, 2 parts by weight or more, 3 parts by weight or more, 4 parts by weight or more, 5 parts by weight or more, 6 parts by weight or more, 7 parts by weight or more, 8 parts by weight or more, 9 parts by weight or more, or 10 parts by weight or more, relative to 100 parts by weight of the polymerizable compound, and may be included in a range of 20 parts by weight or less, 19 parts by weight or less, 18 parts by weight or less, 17 parts by weight or less, 16 parts by weight or less, 15 parts by weight or less, 14 parts by weight or less, 13 parts by weight or less, 12 parts by weight or less or 11 parts by weight or less, relative to 100 parts by weight of the polymerizable compound.

The present application also relates to a polarizing element. The polarizing element may comprise, for example, a polymerized layer of the above-mentioned guest host type liquid crystal composition. That is, the polarizing element may comprise a polymerized layer of the guest host type liquid crystal composition comprising the polymerizable liquid crystal compound without any acryloyl polymerizable functional group and the dichroic dye. Therefore, the contents described in the item of the liquid crystal composition may be equally applied to the contents for the polymerizable liquid crystal compound and the dichroic dye in the polarizing element.

Such a polarizing element may exhibit an excellent heat resistance. For example, the polarizing element may satisfy Equation 1 below. The contents described in the item of the liquid crystal composition can be equally applied to the specific contents for Equation 1 below.

$$-20 \le 100 \times (H-W)/W \le 20 \qquad \text{[Equation 1]}$$

In Equation 1, W is the maximum absorption wavelength of the dye immediately after the polymerizable liquid crystal compound is polymerized, and H is the maximum absorption wavelength of the dye after maintaining the liquid crystal composition having the liquid crystal compound polymerized at 100° C. for 100 hours.

The polymerized layer may be, for example, a coating layer of a polarizing material comprising the polymerizable liquid crystal compound without any acryloyl polymerizable functional group and the dichroic dye. The polymerizable liquid crystal compound may be, for example, a cationic polymerizable liquid crystal compound and more specifically, a liquid crystal compound having a cationic polymerizable functional group such as an epoxy group. Since such a polarizing element may be prepared, for example, by a simple coating process, it may be not only prepared at a low cost, but also it is possible to thin the element through structure simplification.

The thickness of the polymerized layer may be suitably selected depending on the use of the desired polarizing element, and for example, the polymerized layer may have a thickness of 0.5 μm to 10 μm, 1 μm to 9 μm, 2 μm to 8 μm, 3 μm to 7 μm or 4 μm to 6 μm, without being limited thereto.

The polymerized layer may comprise, for example, the polymerizable liquid crystal compound in a polymerized state. In the present application, it can mean for the polymerizable liquid crystal compound to be included in the polymerized state a state that the liquid crystal compound is polymerized to form a skeleton such as a main chain or a side chain of the liquid crystal polymer in the layer. The polymerized layer may also include the polymerizable liquid crystal compound in a horizontally oriented state. In the present application, the horizontal orientation can mean a case that the optical axis of the polymerized layer comprising the polymerized liquid crystal compound has an inclination angle of about 0° to about 25°, about 0° to about 15°, about 0° to about 10°, about 0° to about 5° or about 0° relative to the plane of the polymerized layer. In the present application, the optical axis can mean, for example, a fast axis or a slow axis when the incident light penetrates the corresponding region. In addition, the dichroic dye can be also included in the polymerized layer in a state oriented depending on the orientation direction of the polymerizable liquid crystal compound.

The polarizing element may further comprise an alignment film, and the alignment film may be disposed adjacent to the polymerized layer. FIG. 1 exemplarily shows a polarizing element including a polymerized layer (101) and an alignment film (102) adjacent to the polymerized layer. As long as the alignment film has an orientation capacity for the liquid crystal compound and/or the dichroic dye in the adjacent polymerized layer, it can be selected and used without particular limitation. For example, a contact alignment film such as a rubbing alignment film or the publicly known alignment film that a photo-alignment film compound may be included to show the orientation property by non-contact method such as, for example, irradiation of the linear polarized light can be used.

The alignment film may be, for example, a photo-alignment film, and the photo-alignment film may comprise a photo-orientational compound. In the present application, the term photo-orientational compound can mean a compound to be orientationally ordered into a predetermined direction through irradiation of light and to be also capable of orienting the adjacent liquid crystal compound in the aligned state into a predetermined direction. The orientational compound may be a monomolecular compound, a monomeric compound, an oligomeric compound or a polymeric compound.

The photo-orientational compound may be a compound comprising a photosensitive moiety. The photo-orientational compound that can be used in orientation of the liquid crystal compound is variously known. As the photo-orientational compounds, for example, a compound aligned by trans-cis photoisomerization; a compound aligned by photo-destruction such as chain scission or photo-oxidation; a compound aligned by photo-cross-linking or photopolymerization such as [2+2] cycloaddition, [4+4] cycloaddition or photodimerization; a compound aligned by photo-Fries rearrangement or a compound aligned by ring opening/closure reaction and the like can be used. As the compound aligned trans-cis photoisomerization, for example, an azo compound such as a sulfonated diazo dye or an azo polymer or a stilbene compound and the like can be illustrated; and as the compound aligned by photo-destruction, cyclobutane-1,2,3,4-tetracarboxylic dianhydride, aromatic polysilane or polyester, polystyrene or polyimide and the like can be illustrated. In addition, as the compound aligned by photo-crosslinking or photopolymerization, a cinnamate compound, a coumarin compound, a cinnamamide compound, a tetrahydrophthalimide compound, a maleimide compound, a benzophenone compound or a diphenylacetylene compound, or a compound having a chlconyl residue (hereinafter, a chalcone compound) or a compound having an anthracenyl (anthracenyl) residue (hereinafter, an anthracenyl compound) as a photosensitive residue, etc. can be illustrated; as the compound aligned by photo-Fries rearrangement, an aromatic compound such as a benzoate compound, a benzoamide compound, a methacrylamidoaryl (meth)acrylate compound can be illustrated; and as the compound aligned by ring opening/closure reaction, a compound aligned by ring opening/closure reaction in [4+2] π electronic system such as a spiropyran compound and the like can be illustrated, without being limited thereto.

The photo-orientational compound may be a monomolecular compound, a monomeric compound or an oligomeric compound or a polymeric compound, or may be in a blend form of a polymer with the photo-orientational compound. The oligomeric or polymeric compound above may have a residue derived from the above-described photo-orientational compound or the above-described photosensitive residue in the main chain or the side chain.

As a polymer that may have the residue derived from the photo-orientational compound or the photosensitive residue or be mixed with the photo-orientational compound, polynorbornene, polyolefin, polyarylate, polyacrylate, poly(meth)acrylate, polyimide, poly(amic acid), polymaleinimide, polyacrylamide, polymethacrylamide, polyvinyl ether, polyvinyl ester, polystyrene, polysiloxane, polyacrylonitrile or polymethacrylonitrile and the like can be illustrated, but is not limited thereto.

As the polymer that may be included in the orientational compound, typically polynorbornene cinnamate, polynorbornene alkoxy cinnamate, polynorbornene allyloyloxy cinnamate, polynorbornene fluorinated cinnamate, polynorbornene chlorinated cinnamate or polynorbornene dicinnamate and the like can be illustrated, without being limited thereto.

The polarizing element may further a substrate layer and the substrate layer may be formed, for example, on one surface of the polymerized layer. FIG. 2 exemplarily shows a polarizing element comprising a polymerized layer (101) and a substrate layer (201) formed on one surface of the polymerized layer. Or, if the polarizing element further comprises both the substrate layer and the alignment film, as shown in FIG. 3, it may include the substrate layer (201), the alignment film (102) and the polymerized layer (101) in this order.

As the substrate layer, the publicly known materials can be used, without particular limitation. For example, an inorganic film such as a glass film, a crystalline or amorphous silicon film, quartz or ITO (indium tin oxide) film or a plastic film, and the like can be used. As the substrate layer, an optically isotropic substrate layer or an optically anisotropic substrate layer such as a retardation layer can be used.

As the plastic substrate layer, a substrate layer comprising TAC (triacetyl cellulose); COP (cycloolefin copolymer) such as norbornene dervatives; PMMA (poly(methyl methacrylate)); PC (polycarbonate); PE (polyethylene); PP (polypropylene); PVA (polyvinyl alcohol); DAC (diacetyl cellulose); Pac (polyacrylate); PES (polyether sulfone); PEEK (polyether ether ketone); PPS (polyphenylsulfone), PEI (polyetherimide); PEN (polyethylenenaphthatlate); PET (polyethyleneterephthalate); PI (polyimide); PSF (polysulfone); PAR (polyarylate) or an amorphous fluoropolymer can be used, but is not limited thereto. In the substrate layer, if necessary, a coating layer of gold, silver, or a silicon compound such as silicon dioxide or silicon monoxide, or a coating layer such as an antireflective layer may be also present.

The present application also relates to a method for manufacturing a polarizing element. The method for manufacturing a polarizing element may comprise, for example, polymerizing the aforementioned liquid crystal composition coated on one surface of a substrate layer. The contents described in the items of the liquid crystal composition and the polarizing element may be equally applied to the contents for the substrate layer and the liquid crystal composition in the manufacturing method.

The coating method of the liquid crystal composition on the substrate layer may be carried out, without particular limitation, for example, by coating through the well known coating manner such as roll coating, printing method, inkjet coating, slit nozzle method, bar coating, comma coating, spin coating or gravure coating.

The polymerization method of the liquid crystal composition may be carried out, without particular limitation, by the known method of the liquid crystal compound. For example, in the case of the liquid crystal composition in which the polymerizable liquid crystal compound has a cationic polymerizable functional group, it may be polymerized by the known cationic polymerization reaction. For example, the cationic polymerization reaction may be carried out by a method of maintaining the proper temperature such that the cationic polymerization reaction can be initiated or a method of irradiating suitably active energy ray. If the maintenance at the proper temperature and the irradiation of active energy ray are required at the same time, the processes may proceed sequentially or simultaneously. The irradiation of active energy ray above may be carried out by using a high pressure mercury lamp, an electrodeless lamp or a xenon lamp, and the like, and conditions, such as wavelength, light intensity or light quantity of the irradiating active energy ray, may be selected from the range that the polymerization of the cationic polymerizable liquid crystal compound can be made appropriately.

The present application also relates to a use of the polarizing element. An exemplary polarizing element may be usefully used by being included in display devices. As the display device, an organic EL (electroluminescence) display device, an inorganic EL display device, a field emission display device (FED), a surface field emission display device (SPED), a display device using an electronic paper (electronic ink or electrophoretic element), a plasma display device, a projection display device [for example, a grating light valve (GLV) display device, a display device having a digital micromirror device (digital light processing)] and a piezoelectric ceramic display device may be illustrated, but is not limited thereto. The liquid crystal display device may be, for example, a transmissive liquid crystal display device, a transflective liquid crystal display device, a reflective liquid crystal display device, a direct-view liquid crystal display device or a projection liquid crystal display device. Also, such a display device may be a display device for displaying a two-dimensional image or a stereo display device for displaying a three-dimensional image. The way to configure the display device as above is not particularly limited, and a conventional manner may be applied thereto, as long as the above polarizing element is used.

Advantageous Effects

Since the polarizing element may be prepared by a simple coating process, the guest host type liquid crystal composition of the present application allows not only for reducing the manufacturing cost and lightweight thinning of the polarizing element, but also for manufacturing the polarizing element showing an excellent heat resistant stability without changes of absorption spectrum to transmission spectrum even in a severe condition such as high temperature environment. Such a polarizing element can be applied to various display devices such as liquid crystal display devices, EL display devices, field emission display devices, display devices using electronic papers, projection display devices or piezoelectric ceramic display devices.

BRIEF DESCRIPTION OF DRAWINGS

FIGS. 1 to 3 are schematic views of exemplary polarizing elements.
FIG. 4 shows the results evaluating heat resistant stability of Example and Comparative Example.

MODE FOR CARRYING OUT INVENTION

Hereinafter, the polarizing element will be more specifically described through Example and Comparative Example, but the scope of the present application is not limited by the details shown below.

Example 1

A composition for forming a photo-alignment film was coated on one surface of a plastic substrate (TAC) to have a thickness after drying of about 200 Å, and dried in an oven of 80° C. for 2 minutes. In the above, as the composition for forming a photo-alignment film, a precursor composition of alignment film prepared by dissolving 2 parts by weight of poly(5-norbornene-2-methyl(4-methoxycinnamate)), 1 part by weight of dipentaerythritol hexaacrylate as a polar binder and 0.5 parts by weight of a photoinitiator (Igacure 907, manufactured by Ciba-Geigy AG, Switzerland) in about 96.8 parts by weight of a solvent (toluene) was used. After drying the composition for forming the photo-alignment film, the orientation process was carried out by irradiating UV light (100 mW/cm$^2$) at a speed of 3 m/min.

Subsequently, a liquid crystal composition comprising 1 part by weight of an azo-based cyan dye (G-472, manufactured by HAYABARA Company, absorption wavelength: 600 nm), 20 parts by weight of a polymerizable liquid crystal compound, p-phenylene-di[4-(2,3-epoxypropyloxy)benzoate], and 1 part by weight of a cationic initiator, triarylsulfonium hexafluorophosphate salts, mixed 50% in propylene carbonate (manufactured by Sigma-Aldrich AG), was coated on the oriented alignment layer to have a dry thickness of about 1.5 μm, oriented depending on the orientation of the lower alignment layer, and then irradiated with ultraviolet (300 mW/cm$^2$) at a speed of 10 m/min, whereby liquid crystals were cross-linked and polymerized to prepare a polarizing element.

Comparative Example 1

A polarizing element was prepared by carrying out the same way as Example 1 except for using Acrylate RM (LC242, manufactured by BASF AG) of a radically polymerizable liquid crystal compound as the polymerizable liquid crystal compound.

Test Example 1: Evaluation of Heat Resistant Stability

For the polarizing elements prepared in Example 1 and Comparative Example 1, they were cut to a size of 10 mm×10 mm (width×length) to manufacture specimens, the absorbance depending on wavelengths of which was subsequently measured with N & K Analyer device, and the polarizing elements were left in a high temperature condition at 100° C. for 100 hours, the absorbance depending on wavelengths of which were again measured. The thus measured absorption spectra of the polarizing elements of Example 1 and Comparative Example 1 were shown in FIG. 4.

As shown in FIG. 4, before heat treatment, the polarization elements of Example 1 and Comparative Example 1 both show similar absorption spectra. However, after heat treatment, it can be confirmed that the polarizing element of Example 1 maintains the absorption spectrum, whereas in the polarizing element of Comparative Example 1 the wavelength showing the maximum absorbance changes from about 580 nm to about 400 nm. In the case of using the liquid crystal compound comprising the acryloyl polymerizable group as in Comparative Example 1, the remaining radicals in the process causing the radical polymerization reaction attack the weak part of the azo-based dye in the high temperature condition to degrade the dye molecule so that the absorbance shifts toward the short wavelength, while in the case of using the liquid crystal compound having the cationic polymerizable group as in Example 1, it has no dye degradation by the radicals so that it is possible to secure the stable high temperature durability on using the azo-based dye. From this, it can be seen that the polarizing element according to Example has an excellent heat resistant stability without any change of the absorption spectrum even in a high temperature condition.

Test Example 2: Evaluation of Heat Resistant Light Characterization

The polarizing elements prepared in Example 1 and Comparative Example 1 were cut to a size of 10 mm×10 mm (width×length) to manufacture specimens, and then transmission spectra depending on wavelengths before and after heat treatment were measured with Jasco Spectrophotometer V-7100 device to evaluate heat resistant light characterization, and the results were summarized in Table 1 below.

As shown in Table 1, in the case of the polarizing element of Comparative Example 1 coated with the liquid crystal compound comprising the acryloyl polymerizable group, the single-plate transmittance (Ts: transmittance of one polarizing plate) changed from the initial 31.5% at 600 nm wavelength to 67.1% after 100° C. and 100 hours by about 53% and the wavelength showing the minimum transmission shifted from 600 nm to 460 nm. On the other hand, in the case of the polarizing element of Example 1 coated with the liquid crystal compound comprising the epoxy-based polymerizable group, Ts showed a change ratio of about 7% from the initial 39.6% to 42.6% after heat treatment at the same region of 600 nm. In addition, it was confirmed that the center wavelength did not shift at all from the existing 600 nm. Accordingly, it can be seen that when the cationic polymerizable liquid crystal compound is used, the heat resistant light characterization of the polarizing element is also more superior.

TABLE 1

| | Ts (initial) (%) | Ts (100° C.-100 hr) (%) | ΔTs (%) | Δλ (nm) |
|---|---|---|---|---|
| Comparative Example 1 | 31.5 | 67.1 | 53 | 120 |
| Example 1 | 39.6 | 42.6 | 7 | 0 |

The invention claimed is:

1. A guest host liquid crystal composition comprising a cationic polymerizable liquid crystal compound and a dichroic dye and satisfying Equation 1 below:

−20≤100×(H−W)/W≤20 wherein W is the maximum absorption wavelength of said dye immediately after said polymerizable liquid crystal compound is polymerized, and H is the maximum absorption wavelength of said dye after maintaining the liquid crystal composition having said liquid crystal compound polymerized at 100° C. for 100 hours, wherein the cationic polymerizable liquid crystal compound is a compound of Formula 1 below:

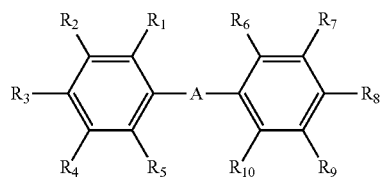

where, A is a single bond, —COO— or —OCO—, $R_1$ to $R_{10}$ are each independently hydrogen, halogen, an alkyl group, an alkoxy group, an alkoxycarbonyl group, a nitro group, an epoxy group, a cyano group, —OQP or a substituent of Formula 2 below, provided that at least one of $R_1$ to $R_{10}$ is an epoxy group, —O-Q-P or a substituent of Formula 2 below, or two adjacent substituents of $R_1$ to $R_5$ or two adjacent substituents of $R_6$ to $R_{10}$ are linked from each other to form a benzene substituted with —O-Q-P, Q is an alkylene group or an alkylidene group, and P is an epoxy group:

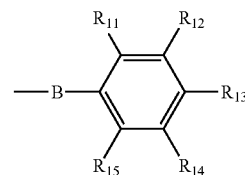

where, B is a single bond, —COO— or —OCO—, $R_{11}$ to $R_{15}$ are each independently hydrogen, halogen, an alkyl group, an alkoxy group, an alkoxycarbonyl group, a nitro group, an epoxy group, a cyano group or —O-Q-P, provided that at least one of $R_{11}$ to $R_{15}$ is an epoxy group, or —O-Q-P, or two adjacent substituents of $R_{11}$ to $R_{15}$ are linked from each other to form a benzene substituted with —O-Q-P, Q is an alkylene group or an alkylidene group, and P is an epoxy group, and wherein the dichroic dye is oriented according to an orientation of the cationic polymerizable liquid crystal compound, and has a maximum absorption wavelength in a range of 400 nm to 700 nm.

2. The guest host liquid crystal composition according to claim 1, wherein the dichroic dye comprises one or more dyes from a cyan dye, an anthraquinone dye, an acridine dye and a naphthalene dye.

3. The guest host liquid crystal composition according to claim 1, wherein the dichroic dye is included in a ratio of 0.1 parts by weight to 20 parts by weight relative to 100 parts by weight of the polymerizable liquid crystal compound.

4. The guest host liquid crystal composition according to claim 1, further comprising a cationic initiator.

5. A polarizing element comprising a polymerized layer of a guest host liquid crystal composition comprising a cationic polymerizable liquid crystal compound and a dichroic dye and satisfying Equation 1 below:

−20≤100×(H−W)/W=20 wherein W is the maximum absorption wavelength of said dye immediately after said polymerizable liquid crystal compound is polymerized, and H is the maximum absorption wavelength of said dye after maintaining the liquid crystal composition having said liquid crystal compound polymerized at 100° C. for 100 hours, wherein the cationic polymerizable liquid crystal compound is a compound of Formula 1 below:

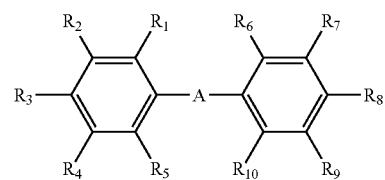

where, A is a single bond, —COO— or —OCO—, $R_1$ to $R_{10}$ are each independently hydrogen, halogen, an alkyl group, an alkoxy group, an alkoxycarbonyl group, a nitro group, an epoxy group, a cyano group, —OQP or a substituent of Formula 2 below, provided that at least one of $R_1$ to $R_{10}$ is an epoxy group, —O-Q-P or a substituent of Formula 2 below, or two adjacent substituents of $R_1$ to $R_5$ or two adjacent substituents of $R_6$ to $R_{10}$ are linked from each other to form a benzene substituted with —O-Q-P, Q is an alkylene group or an alkylidene group, and P is an epoxy group:

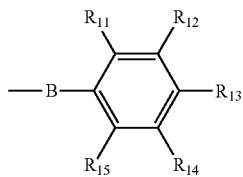

where, B is a single bond, —COO— or —OCO—, $R_{11}$ to $R_{15}$ are each independently hydrogen, halogen, an alkyl group, an alkoxy group, an alkoxycarbonyl group, a nitro group, an epoxy group, a cyano group or —O-Q-P, provided that at least one of $R_{11}$ to $R_{15}$ is an epoxy group, or —O-Q-P, or two adjacent substituents of $R_{11}$ to $R_{15}$ are linked from each other to form a benzene substituted with —O-Q-P, Q is an alkylene group or an alkylidene group, and P is an epoxy group, and wherein the dichroic dye is oriented according to an orientation of the cationic polymerizable liquid crystal compound, and has a maximum absorption wavelength in a range of 400 nm to 700 nm.

6. The polarizing element according to claim 5, wherein the polymerized layer is a coating layer of a polarizing material comprising the cationic polymerizable liquid crystal compound and the dichroic dye.

7. The polarizing element according to claim 5, wherein the polymerized layer has a thickness in a range of 0.5 μm to 10 μm.

8. The polarizing element according to claim 5, wherein the polymerizable liquid crystal compound is included in the polymerized layer in a horizontally oriented state.

9. The polarizing element according to claim 5, further comprising an alignment film adjacent to the polymerized layer.

10. The polarizing element according to claim 9, wherein the alignment film is a photo-alignment film.

11. The polarizing element according to claim 5, further comprising a substrate layer formed on one surface of the polymerized layer.

12. A method for manufacturing a polarizing element comprising polymerizing the liquid crystal composition of claim 1 coated on one surface of a substrate layer.

13. A display device comprising the polarizing element of claim 5.

* * * * *